United States Patent
Inohiza

(10) Patent No.: US 11,923,986 B2
(45) Date of Patent: Mar. 5, 2024

(54) COMMUNICATION DEVICE, COMMUNICATION METHOD, AND COMPUTER-READABLE STORAGE MEDIUM

(71) Applicant: CANON KABUSHIKI KAISHA, Tokyo (JP)

(72) Inventor: Hirohiko Inohiza, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 17/496,638

(22) Filed: Oct. 7, 2021

(65) Prior Publication Data

US 2022/0029749 A1 Jan. 27, 2022

Related U.S. Application Data

(63) Continuation of application No. PCT/JP2020/013388, filed on Mar. 25, 2020.

(30) Foreign Application Priority Data

Apr. 11, 2019 (JP) .................. 2019-075762

(51) Int. Cl.
*H04L 1/1812* (2023.01)
*H04L 1/1829* (2023.01)
*H04L 1/1867* (2023.01)
*H04W 28/02* (2009.01)
*H04W 28/06* (2009.01)

(52) U.S. Cl.
CPC .......... *H04L 1/1812* (2013.01); *H04L 1/1816* (2013.01); *H04L 1/1864* (2013.01); *H04W 28/0215* (2013.01); *H04W 28/06* (2013.01); *H04L 1/1845* (2013.01); *H04L 1/1896* (2013.01)

(58) Field of Classification Search
CPC ... H04L 1/1812; H04L 1/1816; H04L 1/1864; H04L 1/1845; H04L 1/1896; H04W 28/0215; H04W 28/06
USPC ................. 714/712, 748–750; 370/328–331; 455/434
See application file for complete search history.

(56) References Cited

U.S. PATENT DOCUMENTS 11,690,132 B2 * 6/2023 Akkarakaran ....... H04B 7/0626 370/329
2011/0305214 A1 12/2011 Seol et al.
(Continued)

FOREIGN PATENT DOCUMENTS

CN 101053178 A 10/2007
CN 102739376 A 10/2012
(Continued)

OTHER PUBLICATIONS

Kim et al., MAC Implementation for IEEE 802.11 Wireless LAN, 2001, IEEE, pp. 191-195. (Year: 2001).*
(Continued)

*Primary Examiner* — John J Tabone, Jr.
(74) *Attorney, Agent, or Firm* — Canon U.S.A., Inc. IP Division

(57) ABSTRACT

A communication device transmits to a communication partner device or receives from the partner device a radio frame conforming to an IEEE 802.11 standard series, wherein a capability of HARQ (Hybrid Automatic Repeat reQuest) that a device that transmitted the radio frame has is indicated in a MAC (media access control) frame of the radio frame.

15 Claims, 3 Drawing Sheets

(56) References Cited

U.S. PATENT DOCUMENTS

| | | | | |
|---|---|---|---|---|
| 2013/0242889 | A1* | 9/2013 | Khoryaev | H04L 1/1635 |
| | | | | 370/329 |
| 2014/0293868 | A1* | 10/2014 | Levanen | H04L 1/1896 |
| | | | | 370/328 |
| 2017/0126363 | A1* | 5/2017 | Wang | H04W 74/04 |
| 2017/0230149 | A1 | 8/2017 | Wang | |
| 2021/0266111 | A1* | 8/2021 | Kusashima | H04L 1/1819 |
| 2021/0297189 | A1* | 9/2021 | Yoshikawa | H04L 1/1816 |
| 2022/0029749 | A1* | 1/2022 | Inohiza | H04L 1/1864 |

FOREIGN PATENT DOCUMENTS

| | | |
|---|---|---|
| CN | 105453472 A | 3/2016 |
| JP | 2016-001867 A | 1/2016 |
| JP | 2016-511585 A | 4/2016 |
| JP | 2016177097 A | 10/2016 |
| JP | 2016-213760 A | 12/2016 |
| JP | 2018-050133 A | 3/2018 |
| WO | 2014/124048 A1 | 8/2014 |

OTHER PUBLICATIONS

Imran Latif (Quantenna); "HARQ in EHT", IEEE Draft; 11-18-2029-00-0EHT-HARQ in EHT, IEEE-SA Mentor, Piscataway NJ USA; vol. 802.11 EHT; Nov. 19, 2018; XP068133559; Retrieved form the Internet: URL: https://mentor.ieee.org/802.11/dcn/18/11-18-2029-00-0eht-harq-in-eht.pptx; pp. 1-7.

* cited by examiner

HARQ element format

| Element ID | Length | HARQ support | HARQ type |
|---|---|---|---|
| 601 | 602 | 603 | 604 |

| HARQ type value | Meaning |
|---|---|
| 0 | Chase Combining |
| 1 | Incremental Redundancy |
| 2 | Partial Chase Combining |
| 3 | Partial Incremental Redundancy |

COMMUNICATION DEVICE, COMMUNICATION METHOD, AND COMPUTER-READABLE STORAGE MEDIUM

CROSS-REFERENCE TO RELATED APPLICATIONS

This application is a Continuation of International Patent Application No. PCT/JP2020/013388, filed Mar. 25, 2020, which claims the benefit of Japanese Patent Application No. 2019-075762, filed Apr. 11, 2019, both of which are hereby incorporated by reference herein in their entireties.

BACKGROUND OF THE INVENTION

Field of the Invention

The present invention relates generally to a communication device, a communication method, and a program, and more specifically to a technique for communication control in a wireless LAN.

Background Art

As a communication standard related to wireless LAN (Wireless Local Area Network), the IEEE (Institute of Electrical and Electronics Engineers) 802.11 standard is known. In the IEEE 802.11ax standard, which is the latest standard among the IEEE 802.11 standard series, an OFDMA (Orthogonal Frequency Division Multiple Access) is used to realize an improvement in communication rate in a congested situation in addition to high peak throughput (refer to Patent Literature 1 below).

Currently, a Study Group called IEEE 802.11 EHT (Extremely High Throughput) has been formed as a subsequent standard to IEEE 802.11ax for further throughput improvement. In EHT, application of HARQ (Hybrid Automatic Repeat reQuest) with soft combining technology between access points (AP) and stations (STA) is examined. The use of HARQ with soft combining enables efficient transmission of data as compared with the use of conventional ARQ (Automatic Repeat reQuest (ARQ)).

It can be useful for a communication device that has received a radio frame to quickly confirm whether or not HARQ is being used in the transmission of data by that radio frame. On the other hand, HARQ is not used in a conventional standard. For this reason, there is no mechanism for a communication device to recognize whether a partner device can execute communication using HARQ. Similarly, there is no mechanism for a partner device to recognize whether a communication device can use HARQ.

CITATION LIST

Patent Literature

[Patent Literature 1] Japanese Patent Laid-Open No. 2018-050133

SUMMARY OF THE INVENTION

The present invention provides a technique for enabling a communication device and a partner device to mutually recognize the other's HARQ capabilities.

A communication device according to one aspect of the present invention includes one or more processors; and one or more memories that stores a computer-readable instruction for causing, when executed by the one or more processors, the communication device to transmit to a communication partner device or to receive from the partner device a radio frame conforming to an IEEE 802.11 standard series, wherein a HARQ (Hybrid Automatic Repeat reQuest) capability that a device that transmitted the radio frame has is indicated in a MAC (media access control) frame of the radio frame.

Further features of the present invention will become apparent from the following description of exemplary embodiments with reference to the attached drawings.

DESCRIPTION OF THE EMBODIMENTS

Figure 1:
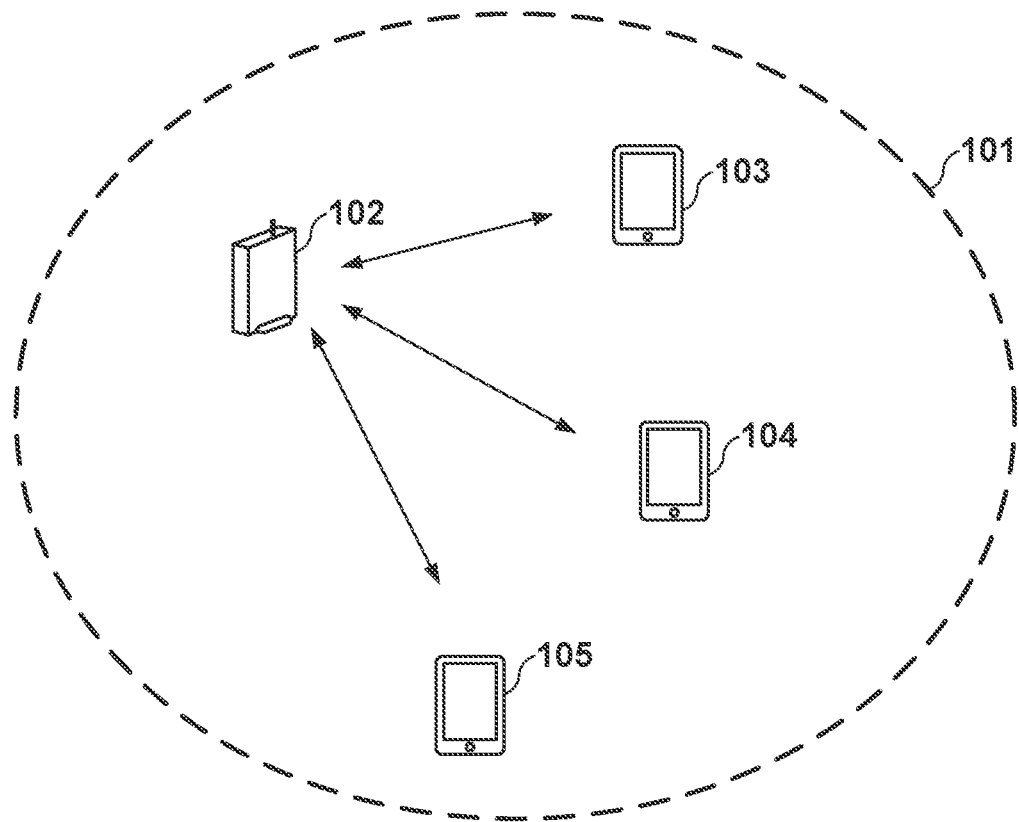
FIG. 1 is a view illustrating an example of a configuration of a wireless communication network.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(Network Configuration)

FIG. 1 illustrates an example of a configuration of a wireless communication network of the present embodiment. This wireless communication network is configured to include one access point (AP) and three stations (STA). Here, an AP 102 and an STA 103 to an STA 105 conform to IEEE 802.11 EHT (Extremely High Throughput) and are configured to be capable of performing wireless communication conforming to standards established prior to the IEEE 802.11 EHT standard. Note that the name "IEEE 802.11EHT" is provided for convenience and may be a different name when the standard is finalized, but the present specification and the appended scope of the claims are intended to cover all standards that may support the processing described below. In the following, when a specific device is not referred to or the like, an access point may be referred to as an "AP" and a station (terminal) may be referred to as an "STA without adding a reference numeral." Note that although FIG. 1 illustrates a wireless communication network including one AP and three STAs as an example, the number of these communication devices may be larger or smaller than illustrated. As an example, if the STAs are communicating with each other, an AP may not be present. In FIG. 1, a communicable range of a network that the AP 102 forms is indicated by a circle 101. Note that this communicable range may cover a wider range or may cover only a narrower range. Note that EHT may be interpreted as an acronym for Extreme High Throughput.

(Device Configuration)

Figure 2:
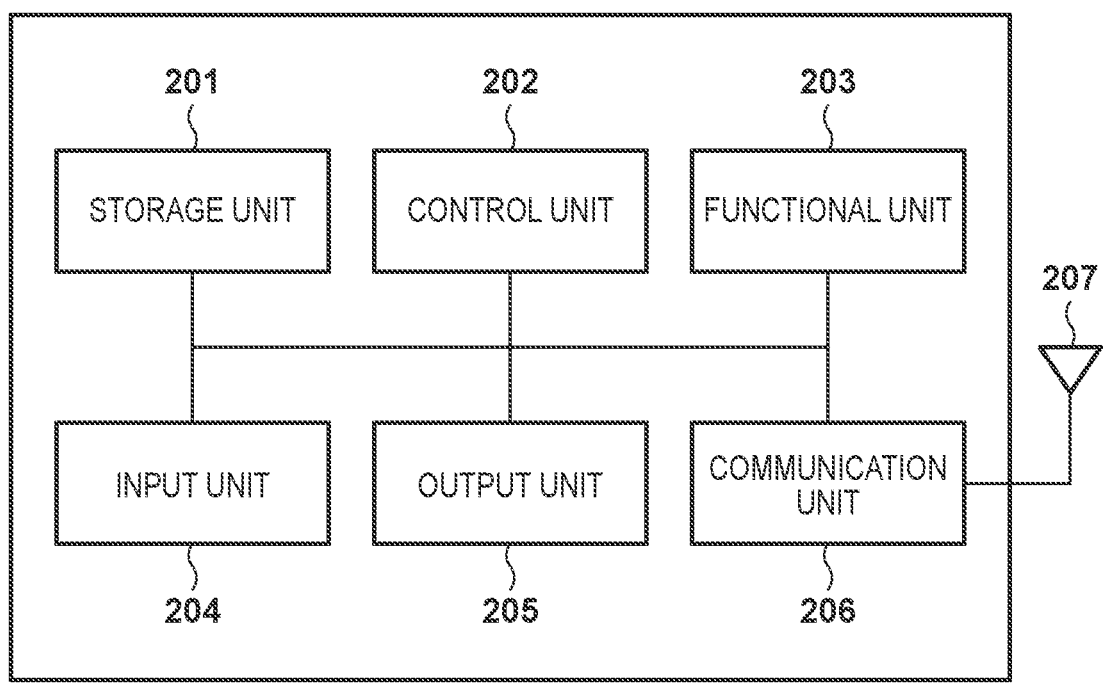
FIG. 2 is a view illustrating an example of a hardware configuration of a communication device.

FIG. 2 illustrates an example of a hardware configuration of communication devices (AP and STA). As an example of a hardware configuration, the communication device includes a storage unit 201, a control unit 202, a functional unit 203, an input unit 204, an output unit 205, a communication unit 206, and an antenna 207.

The storage unit 201 is configured by both or either one of a ROM and a RAM, and stores programs for performing various operations to be described later and various kinds of information such as communication parameters for wireless communication. Note that in addition to memories such as ROM and RAM, a storage medium such as a flexible disk, a hard disk, an optical disk, a magneto-optical disk, a CD-ROM, a CD-R, a magnetic tape, a non-volatile memory card, or a DVD may be used as the storage unit 201.

The control unit 202 is configured by, for example, one or more processors such as a CPU and an MPU, an ASIC (Application Specific Integrated Circuit), a DSP (Digital Signal Processor), an FPGA (Field Programmable Gate Array), and the like. Here, CPU is an acronym for Central Processing Unit and MPU is an acronym for Micro Processing Unit. The control unit 202 controls the entire device by executing programs stored in the storage unit 201. Note that the control unit 202 may control the entire device in cooperation with programs and an OS (Operating System) stored in the storage unit 201. In addition, the control unit 202 may include circuits for generating and decoding error correction codes in relation to HARQ (Hybrid Automatic Repeat reQuest) in communication via the communication unit 206.

Further, the control unit 202 controls the functional unit 203 and executes predetermined processing such as image capturing, printing, and projection. The functional unit 203 is hardware for the device to execute predetermined processing. For example, if the device is a camera, the functional unit 203 is an image capturing unit and performs image capturing processing. In addition, for example, if the device is a printer, the functional unit 203 is a printing unit and performs printing processing. In addition, for example, if the device is a projector, the functional unit 203 is a projection unit and performs projection processing. The data that the functional unit 203 processes may be data stored in the storage unit 201, or data communicated with another AP or STA via the communication unit 206 to be described later.

The input unit 204 accepts various operations from the user. The output unit 205 performs various outputs to the user. Here, the outputs by the output unit 205 include, for example, at least one of a display on the screen, an audio output by the speaker, a vibration output, and the like. Incidentally, both the input unit 204 and the output unit 205 may be realized by one module as in the case of a touch panel.

The communication unit 206 controls the wireless communication that conforms to the IEEE 802.11 standard series and controls the IP communication. The communication unit 206 is a so-called radio chip, and may include one or more processors and memories in itself. In the present embodiment, the communication unit 206 can execute processing that conforms to at least the IEEE 802.11 EHT standard. Further, the communication unit 206 controls the antenna 207 to transmit/receive radio signals for wireless communication. The device communicates contents such as image data, document data, and video data with other communication devices through the communication unit 206. The antenna 207, for example, is an antenna capable of transmitting/receiving at least one of a sub-GHz band, 2.4 GHz band, 5 GHz band, and 6 GHz band. Note that there is no particular limitation on a frequency band (or a combination thereof) that can be handled by the antenna 207. The antenna 207 may be a single antenna, or may be a set of two or more antennas for performing MIMO (Multi-Input and Multi-Output) transmission/reception. Further, although in FIG. 2, one antenna 207 is illustrated, two or more (two or more sets) antennas that can respectively support different frequency bands may be included, for example.

Figure 3:
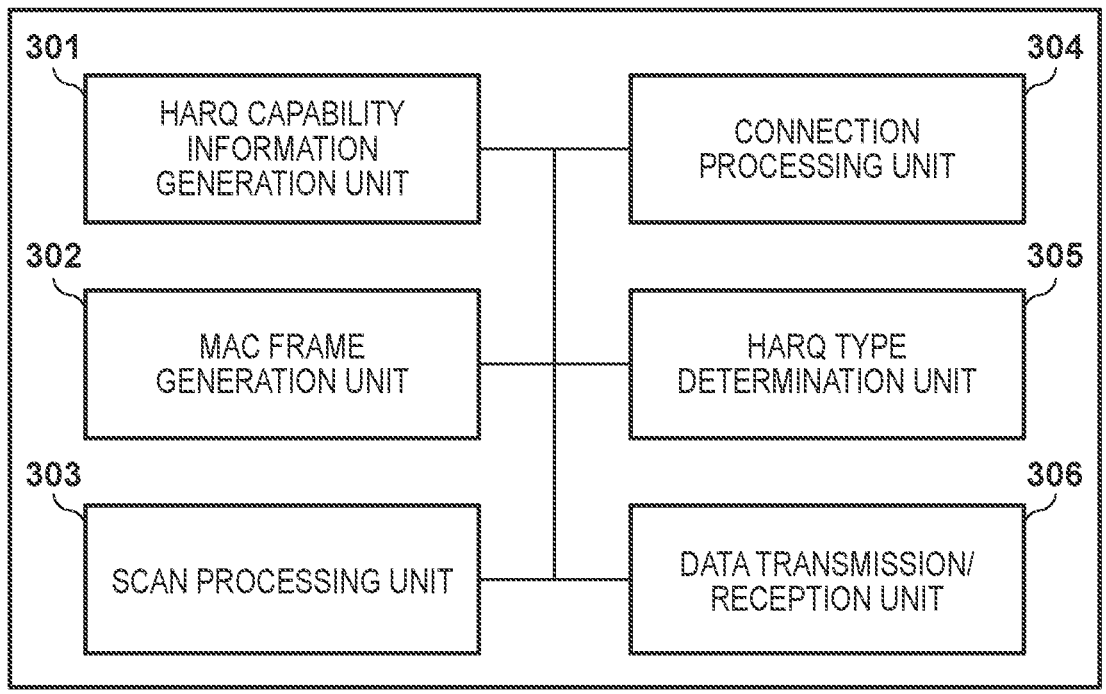
FIG. 3 is a view illustrating an example of a functional configuration of the communication device.

FIG. 3 illustrates an example of a functional configuration of communication devices (AP and STA). The communication device includes, as an example, a HARQ capability information generation unit 301, a MAC frame generation unit 302, a scan processing unit 303, a connection processing unit 304, a HARQ type determination unit 305, and a data transmission/reception unit 306.

The HARQ capability information generation unit 301 generates information indicating whether or not the communication device can use HARQ, information indicating supported HARQ types when HARQ can be used, and the like. The MAC frame generation unit 302 generates a MAC (medium access control) frame of the radio frame transmitted by the communication device. The MAC frame generation unit 302 generates as necessary a MAC frame in which HARQ capability information generated by the HARQ capability information generation unit 301 is stored. Here, the radio frame transmitted including the MAC frame may be any one of a Beacon frame, a Probe Request frame, and a Probe Response frame. The radio frame may be either an Association Request frame or an Association Response frame. Furthermore, the radio frame may be either a Reassociation Request frame or a Reassociation Response frame.

The scan processing unit 303 executes processing for an STA to acquire the network information of an AP. For example, when the communication device is an STA, the scan processing unit 303 receives a Beacon frame from a surrounding AP, transmits a Probe Request frame, and executes processing of receiving a Probe Response frame from the AP. Further, when the communication device is an AP, the scan processing unit 303 transmits a Beacon frame and executes processing of transmitting a Probe Response frame when the Probe Request frame is received from an STA. The connection processing unit 304 performs processing for an STA to connect to the network managed by an AP. When the communication device is an STA, the connection processing unit 304 transmits an Association Request frame to an AP and receives an Association Response frame from the AP. Further, when the communication device is an AP, the connection processing unit 304 receives an Association Request frame from an STA and transmits an Association Response frame to the STA as a response to the frame. HARQ capability information is exchanged between an AP and an STA in the scan processing performed by the scan processing unit 303 or the connection processing performed by the connection processing unit 304.

The HARQ type determination unit 305, when it is determined that data transmission/reception is performed using HARQ based on the capability information of HARQ exchanged with the communication partner device, determines the type of HARQ to be used. The data transmission/reception unit 306, when it is determined that data transmission/reception will be performed by HARQ, transmits/receives data frames based on a HARQ type determined by the HARQ type determination unit 305. Note that the data transmission/reception unit 306, when it is determined that data transmission/reception will not be performed by HARQ, may transmit/receive data by ARQ (automatic retransmission request) supported by a conventional standard such as IEEE 802.11ax.

(Processing Flow)

Figure 4:
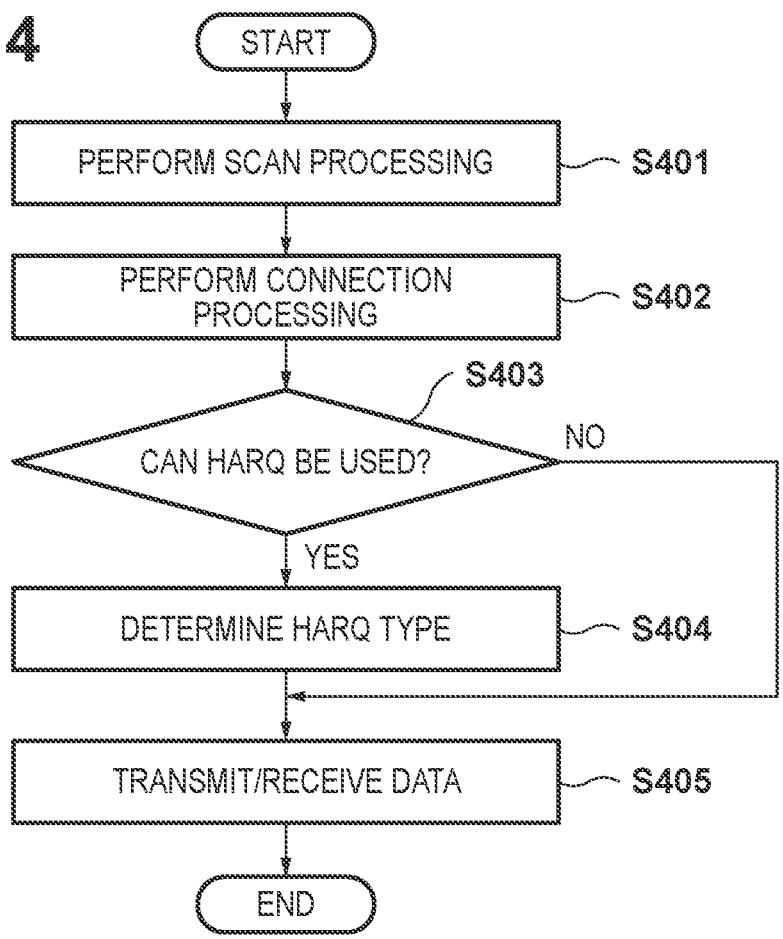
FIG. 4 is a view illustrating an example of a flow of processing that the communication device executes.

Next, an example of the flow of processing executed by the communication device will be described with reference to FIG. 4. In this processing, first, the communication device (AP or STA) executes scan processing (step S401). If the communication device is an STA, the communication device may receive a Beacon frame transmitted by an AP, thereby obtaining the network information of the AP. In this instance, the communication device may actively transmit a Probe Request frame and receive a Probe Response frame from an AP to acquire the network information of the AP. Here, in the present embodiment, in a Beacon frame and a Probe Response frame transmitted by an AP that conforms to IEEE 802.11 EHT, the capability information of HARQ of that AP may be included. In addition, a Probe Request transmitted by an STA that conforms to IEEE 802.11 EHT may include the capability information of HARQ of that STA. By this scan processing, the capability information of HARQ can be exchanged between an STA and an AP.

Next, the communication device performs processing of connecting with a partner device (step S402). If the communication device is an STA, the communication device transmits an Association Request frame to an AP and receives an Association Response frame including a connection result from the AP as a response. Further, if the communication device is an AP, the communication device, in response to receiving an Association Request frame from an STA, transmits an Association Response frame including a connection result to the STA as a response. It is also possible for an Association Request frame and an Association Response frame to include the capability information of HARQ of the transmitter thereof. In one example, an STA may determine the capability information of HARQ to be included in an Association Request frame based on the capability information of HARQ of an AP acquired in the scan processing. For example, an STA, even if its own device can use HARQ, may indicate in the capability information of HARQ in an Association Request frame that HARQ cannot be used in its own device if an AP cannot use HARQ. Further, an STA may determine its own HARQ type in accordance with the type of HARQ that an AP can use, for example. Similarly, an AP may determine the capability information of HARQ of its own device included in an Association Response frame based on the capability information of HARQ of an STA included in an Association Request frame.

The communication device determines whether or not HARQ can be used in communication with the partner device based on the capability information of HARQ exchanged in the connection processing and the like (step S403). When the communication device determines that HARQ can be used (YES in step S403), it determines the type of HARQ to be used for transmitting/receiving data frames (step S404). This determination of the type of HARQ may be made by selecting one type from a plurality of HARQ types. Note that the type of HARQ does not necessarily need to be determined, and a specific type of HARQ specified in advance may be used at all times (unless particularly specified by a user, partner device, or the like). The communication device transmits/receives data frames to and from the partner device based on the type of HARQ determined in step S404 (step S405). Incidentally, the communication device, when it is determined that HARQ cannot be used (NO in step S403), transmits/receives data frames to and from the partner device without determining the type of HARQ and without using HARQ (step S405).

Next, an example of a flow of processing performed between an AP and an STA until data transmission/reception is performed will be described with reference to FIG. 5. An AP and an STA perform scan processing as in steps S501 to S503, for example. That is, the AP may transmit a Beacon frame including the capability information of HARQ of its own device (step S501). The Beacon frame is transmitted at a predetermined cycle such as, for example, 100 milliseconds. Also, the STA may transmit a Probe Request frame including the capability information of HARQ of its own device (step S502). In this case, the AP, in response to receiving the Probe Request frame, transmits a Probe Response frame including the capability information of HARQ of its own device (step S503). Then, the STA receives this Probe Response frame. As a result, the AP and the STA can acquire the capability information of HARQ of the partner device.

Next, the AP and the STA perform connection processing as in steps S504 to S505, for example. In other words, the STA transmits an Association Request frame including the capability information of HARQ of its own device to the AP (step S504). Then, the AP, when this Association Request frame is received, returns a response including a connection result to the STA using an Association Response frame including the capability information of HARQ of its own device (step S505). Note that when the STA roams to another AP, instead of an Association Request frame, a Reassociation Request frame is used. Also, in this instance, a Reassociation Response frame is used instead of an Association Response frame. That is, in this instance, a Reassociation Request frame is transmitted in step S504, and a Reassociation Response frame is transmitted in step S505. The AP and the STA determine whether to use HARQ to transmit/receive data frames based on the capability information of HARQ exchanged by the connection processing in steps S504 and S505. Also, the AP and the STA, if it is determined to use HARQ, further determines the type of HARQ. Then, the AP and the STA perform transmission/reception of data frame based on the determination (step S506).

Figures 5, 6, 7:
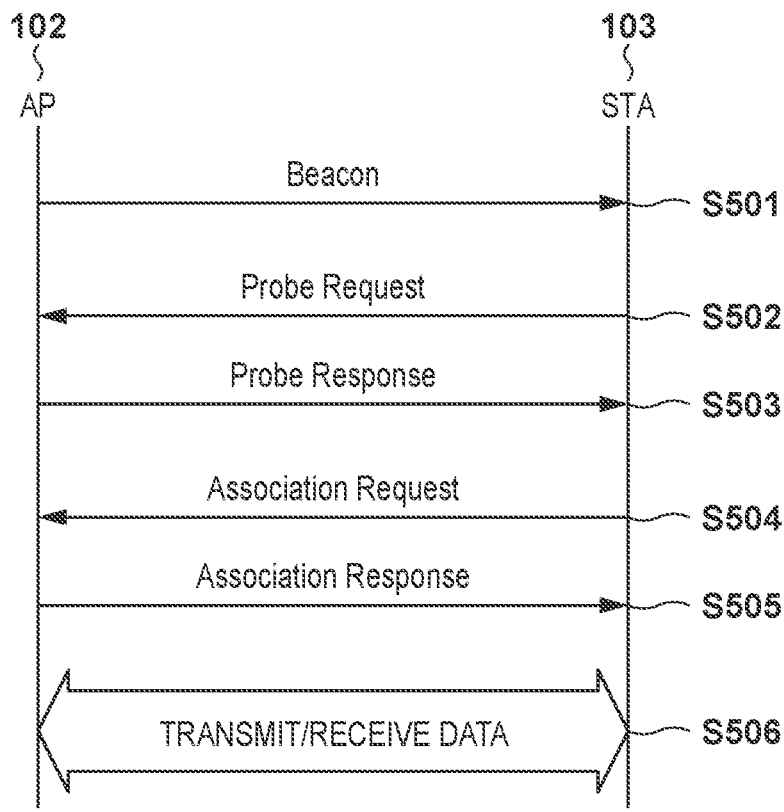
FIG. 5 is a view illustrating an example of a flow of processing related to communication in the wireless communication network.
FIG. 6 is a view illustrating an example of a configuration of a HARQ Element.
FIG. 7 is a view illustrating an example of information that indicates a HARQ type.

FIG. 6 illustrates an example of capability information (HARQ element) of HARQ. HARQ elements are information that can be added to a MAC frame within a radio frame. The radio frame may be a Beacon frame, a Probe Request/Response frame, an Association Request/Response frame, or a Reassociation Request/Response frame. The HARQ element includes an Element ID field 601 that identifies an information element and a Length field 602 that indicates the data length of the information element similarly to other Information Elements specified in the IEEE 802.11 standard. Also, the HARQ element includes a HARQ support field 603 and a HARQ type field 604 as Element-specific information.

The HARQ support field 603 stores information indicating whether or not HARQ can be used, and for example, that HARQ cannot be used is indicated by a value of "0", and that HARQ can be used is indicated by a value of "1". Note that whether or not HARQ can be used may be indicated by the presence or absence of a HARQ element itself in a MAC frame without using the HARQ support field 603. That is, not including a HARQ element in a MAC frame may indicate that HARQ cannot be used, and including a HARQ element in a MAC frame may indicate that HARQ can be used. The HARQ type field 604 is information that indicates the type of HARQ to be used when HARQ can be used. The types of HARQ are mainly Chase Combining and Incremental Redundancy. Also, as derivatives of these, there are, for example, Partial Chase Combining, Partial Incremental Redundancy, and the like. Since these methods are conventional techniques, descriptions are omitted here.

Here, FIG. 7 illustrates an example of the information stored in the HARQ type field 604 when the above-described four types are used. In this example, four types are used, so each number from 0 to 3 is assigned to a separate type. That is, the value "0" indicates Chase Combining, and the value "1" indicates Incremental Redundancy as the type of HARQ to be used. Also, the value "2" indicates Partial Chase Combining, and the value "3" indicates Partial Incremental Redundancy as the type of HARQ to be used. Note that the type of HARQ is not limited to these, and other types of HARQ may be used. In this instance, the value stored in the HARQ type field 604 may take five or more values. That is, in the example of FIG. 7, the HARQ type field 604 may be configured as information of 2 bits, but may be configured as information of three bits or more. The HARQ type field 604 may also indicate two types of HARQ with information of 1 bit. Note that the name of the field and the position/size of the bits described above are not limited to this example, and the same information may be stored in a field of a different field name, or the order and size in which the information is stored may be different from those described above.

As described above, a communication device, when a radio frame is received, can quickly recognize information related to the HARQ capability of a partner device. In addition, the communication device can notify the partner device of information related to the HARQ capability of its own device. Thus, it is possible to appropriately perform communication using HARQ between the communication device and the partner device. For example, the communication device can activate a communication function in a HARQ of a type determined based on the HARQ capabilities of the partner device and its own device. Also, the communication device may also have, for example, a processing circuit for each type of HARQ that can be used, and in this case, the processing circuit of the type of HARQ that is not used may be turned off. Also, the communication device may have a plurality of processing units for parallel processing of data, for example, and may distribute to a first communication processing unit a series of data transmitted using HARQ of a first type. Then, the communication device may distribute to a second communication processing unit a series of data transmitted using HARQ of a second type. Furthermore, the communication device may distribute to a third communication processing unit a series of data transmitted without using HARQ. As a result, a group of data having a certain relationship with each other can be easily processed collectively, and communication with a plurality of partner devices can be efficiently executed.

According to the present invention, a communication device and a partner device can mutually recognize the other's HARQ capabilities.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication device comprising:
   one or more processors; and
   one or more memories that store a computer-readable instruction for causing, when executed by the one or more processors, the communication device to receive from a partner device a radio frame conforming to an IEEE 802.11 standard series, wherein the radio frame contains a Media Access Control (MAC) frame that indicates a capability related to Hybrid Automatic Repeat reQuest (HARQ) of the partner device,
   wherein in a case where the partner device that transmitted the radio frame can use HARQ, it is indicated that the partner device has a capability to use HARQ by information indicating the capability related to HARQ being included in the MAC frame of the radio frame, and in a case where the partner device that transmitted the radio frame does not have a capability to use HARQ, it is indicated that the partner device cannot use HARQ by the information indicating the capability related to HARQ not being included in the MAC frame of the radio frame.

2. The communication device according to claim 1, wherein information that indicates whether or not the partner device that transmitted the radio frame can use HARQ is included in the radio frame as information indicating the capability related to HARQ.

3. The communication device according to claim 1, wherein in a case where it is indicated that the partner device that transmitted the radio frame has a capability to use HARQ, information indicating a type of HARQ that the partner device can use is included in the MAC frame of the radio frame.

4. The communication device according to claim 3, wherein the type of HARQ includes at least one of Chase Combining, Incremental Redundancy, Partial Chase Combining, and Partial Incremental Redundancy.

5. The communication device according to claim 3, wherein the information indicating the type of HARQ indicates one type from among three or more types of HARQ, and the one type is indicated by using a field with two or more bits in the MAC frame.

6. The communication device according to claim 1, wherein the computer-readable instruction further causes, when executed by the one or more processors, the communication device to determine a type of HARQ to be used by the communication device based on the capability related to HARQ of the partner device and the capability related to HARQ of the communication device.

7. The communication device according to claim 6, wherein in a case where it is determined based on the capability related to HARQ of the partner device indicated in the received MAC frame that the partner device does not have a capability to use HARQ, the communication device determines not to use HARQ, and in a case where it is determined not to use HARQ, regardless of the capability related to HARQ that the communication device has, the communication device transmits, to the partner device, a radio frame in which a capability indicating that HARQ is not to be used is indicated as the capability related to HARQ of the communication device.

8. The communication device according to claim 7, wherein the communication device transmits to the partner device the radio frame in which the determined type of HARQ is included.

9. The communication device according to claim 1, wherein the capability related to HARQ of the communication device is notified to the partner device by transmitting the radio frame to the partner device.

10. The communication device according to claim 1, wherein by the MAC frame in any of a Beacon frame, a Probe Request frame, a Probe Response frame, an Association Request frame, an Association Response frame, a Reassociation Request frame, and a Reassociation Response frame, the capability of HARQ of a device that transmitted that frame is indicated.

11. A communication method to be executed by a communication device, comprising receiving from a partner device a radio frame conforming to an IEEE 802.11 standard series, wherein the radio frame contains a Media Access Control (MAC) frame that indicates a capability related to Hybrid Automatic Repeat reQuest (HARQ) of the partner device, wherein in a case where the partner device that transmitted the radio frame can use HARQ, it is indicated that the partner device has a capability to use HARQ by information indicating the capability related to HARQ being included in the MAC frame of the radio frame, and in a case where the partner device that transmitted the radio frame does not have a capability to use HARQ, it is indicated that the partner device cannot use HARQ by the information indicating the capability related to HARQ not being included in the MAC frame of the radio frame.

12. A non-transitory computer readable storage medium that stores a program for causing a computer included in a communication device to receive from a partner device a radio frame conforming to an IEEE 802.11 standard series, wherein the radio frame contains a Media Access Control (MAC) frame that indicates a capability related to Hybrid Automatic Repeat reQuest (HARQ) of the partner device, wherein in a case where the partner device that transmitted the radio frame can use HARQ, it is indicated that the partner device has a capability to use HARQ by information indicating the capability related to HARQ being included in the MAC frame of the radio frame, and in a case where the partner device that transmitted the radio frame does not have a capability to use HARQ, it is indicated that the partner device cannot use HARQ by the information indicating the capability related to HARQ not being included in the MAC frame of the radio frame.

13. A communication device comprising:

one or more processors; and one or more memories that store a computer-readable instruction for causing, when executed by the one or more processors, the communication device to transmit to a communication partner device a radio frame conforming to an IEEE 802.11 standard series, wherein the radio frame contains a Media Access Control (MAC) frame that indicates a capability related to Hybrid Automatic Repeat reQuest (HARQ) of the partner device, wherein in a case where the communication device can use HARQ, it is indicated that the communication device has a capability to use HARQ by information indicating the capability related to HARQ being included in the MAC frame of the radio frame, and in a case where the communication device does not have a capability to use HARQ, it is indicated that the communication device cannot use HARQ by the information indicating the capability related to HARQ not being included in the MAC frame of the radio frame.

14. The communication device according to claim 13, wherein in a case where it is indicated that the communication device has a capability to use HARQ, information indicating a type of HARQ that the communication device can use is included in the MAC frame of the radio frame.

15. The communication device according to claim 14, wherein the information indicating the type of HARQ indicates one type from among three or more types of HARQ, and the one type is indicated by using a field with two or more bits in the MAC frame.

* * * * *